United States Patent [19]

Pettersson

[11] Patent Number: 4,457,648
[45] Date of Patent: Jul. 3, 1984

[54] MEANS FOR CONVEYING A MIXTURE OF PRODUCTS HAVING DIFFERENT DENSITY

[75] Inventor: Karl-Axel G. Pettersson, Sollebrunn, Sweden

[73] Assignee: Sven-Erik Ahl, Vara, Sweden

[21] Appl. No.: 321,161

[22] PCT Filed: Mar. 5, 1981

[86] PCT No.: PCT/SE81/00064
§ 371 Date: Nov. 9, 1981
§ 102(e) Date: Nov. 9, 1981

[87] PCT Pub. No.: WO81/02565
PCT Pub. Date: Sep. 17, 1981

[30] Foreign Application Priority Data

Mar. 11, 1980 [SE] Sweden ............................ 8001889

[51] Int. Cl.³ ............................................. B65G 53/60
[52] U.S. Cl. .................................................. 406/175
[58] Field of Search ............... 406/83, 84, 163, 168, 406/175, 154; 239/290, 291, 654; 141/67, 286

[56] References Cited

U.S. PATENT DOCUMENTS

| | | |
|---|---|---|
| 1,087,667 | 2/1914 | Kise . |
| 1,184,860 | 5/1916 | Lob . |
| 1,213,820 | 1/1917 | Bergman . |
| 2,010,231 | 8/1935 | Heist .................. 406/168 X |
| 3,078,127 | 2/1963 | Miller .................... 406/154 |
| 3,203,044 | 8/1965 | Hardouin et al. . |
| 3,217,364 | 11/1965 | Genest .................. 141/67 X |
| 3,229,850 | 1/1966 | Gartner ............... 239/291 X |

FOREIGN PATENT DOCUMENTS

| | | | |
|---|---|---|---|
| 55173 | 11/1974 | Australia ............................ 239/654 |
| 8957 | 3/1980 | European Pat. Off. . |
| 1185535 | 1/1965 | Fed. Rep. of Germany . |
| 2429974 | 1/1976 | Fed. Rep. of Germany . |
| 53626 | 1/1967 | German Democratic Rep. .................................. 406/175 |

Primary Examiner—Jeffrey V. Nase
Attorney, Agent, or Firm—Dennison, Meserole, Pollack & Scheiner

[57] ABSTRACT

A transport pipe for a compressed-air conveying of a homogeneous mixture, the pipe including a nozzle on the outlet end of the pipe for discharge of the mixture into a storage container. The nozzle comprises a throughflow opening for passage of the mixture therethrough, and lateral openings for the discharge of compressed air into a mixture-confining sheath of compressed air about the mixture.

4 Claims, 1 Drawing Figure

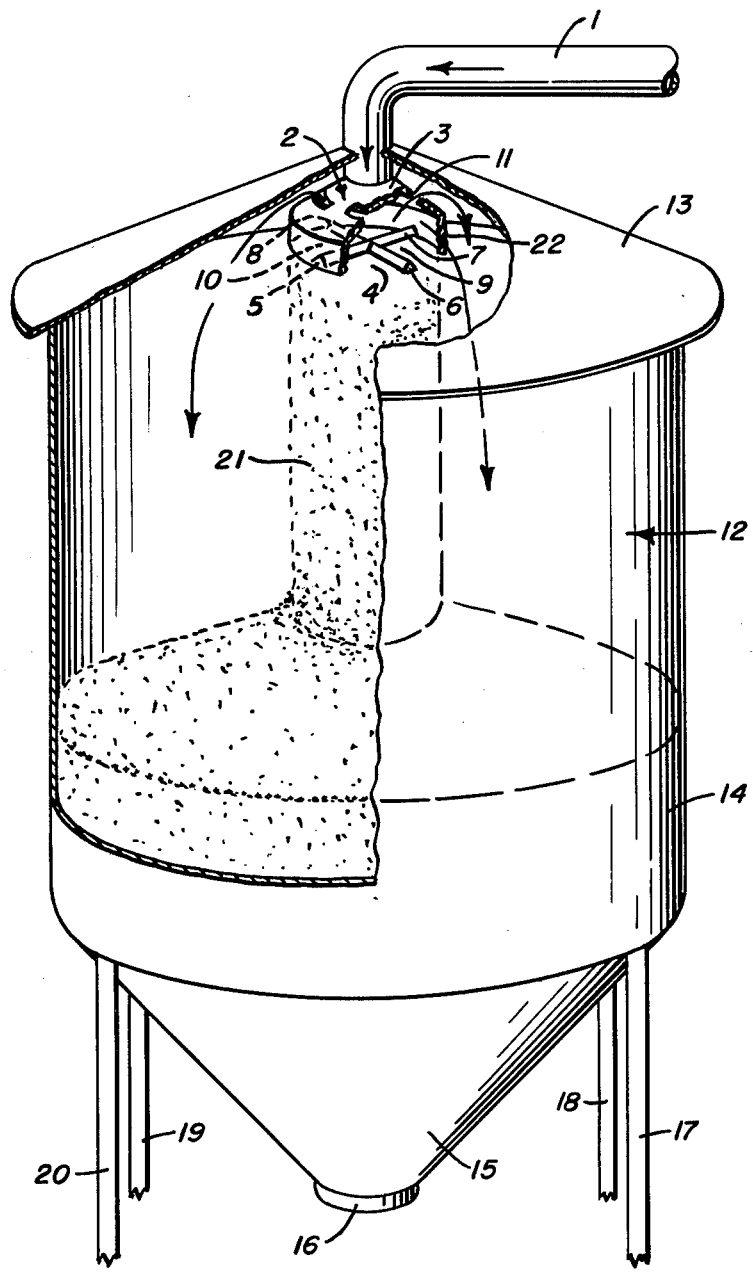

MEANS FOR CONVEYING A MIXTURE OF PRODUCTS HAVING DIFFERENT DENSITY

BACKGROUND OF THE INVENTION

The present invention relates to a means for conveying a mixture of products having different density from one place to another via a transport pipe and with the help of compressed air. The mixture may contain particles of different sizes. It is desirable for the mixture to be as homogenous as possible and not divided into layers of different sizes. An example of such a mixture is fodder mixtures which may contain both largish particles and particles in the form of powdered grains. In the case of fodder it is important for the mixture to be as homogenous as possible since it is to be used for feeding animals and it is important for the animals to receive a correctly balanced mixture on which to feed. A fodder mix may be fully homogenous at the delivery point, transferred to a tank vehicle and then transported to a consumer who generally has a silo. The mixture is transferred to the silo from the tank via a transport pipe using compressed air. When the fodder mix is emptied into the silo, the homogeneity is generally lost, which is a disadvantage to the consumer. To prevent this happening the use of a cyclone has been suggested at the top of the silo to maintain the homogeneity. However, the cyclone has the drawback that its walls are worn relatively quickly by passing fodder.

SUMMARY OF THE INVENTION

The object of the present invention is to achieve retained homogeneity in the fodder mix when it is emptied into the silo, without the use of a cyclone. This is achieved by allowing the fodder mix to pass through a nozzle at the top of the silo, the nozzle being designed so that a sheath of compressed air is formed around the fodder mix flowing through the nozzle. The existence of this sheath ensures that the fodder mix being emptied into the silo retains its homogeneity.

Should it be necessary to transfer a homogenous fodder mix from a tank vehicle to an arbitrary storage place with retained homogeneity it is quite sufficient to use a casing of solid material which is closed at one end and is provided at this end with a nozzle of the type described so that a sheath of compressed air is obtained inside the casing while the fodder mix is being emptied.

When transferring the fodder mix from a tank vehicle to a silo it is advisable to work with an air pressure up to about 1 kg/cm$^2$.

The density of the various particles in the fodder mix varies between 450 and 850 kg/m$^3$.

A suitable transport volume per time unit when transferring a fodder mix from a tank vehicle to a silo is 1000 m$^3$/hour.

When transferring fodder mix approximately 10% of the volume should be fodder and 90% compressed air. If the mixture consists mainly of flour 40% of the volume should be mix and 60% compressed air.

Additional features of the present invention are revealed in the following detailed description.

BRIEF DESCRIPTION OF THE DRAWING

The single FIGURE of the drawing illustrates the apparatus of the invention in operative position within a silo.

DETAILED DESCRIPTION OF THE INVENTION

The FIGURE shows a transport pipe 1 for transferring homogenous fodder mix from a tank vehicle with the help of compressed air having a pressure up to 1 kg/cm$^2$. The transport pipe opens into a nozzle 2, this being in the form of a housing comprising a cylindrical wall section 22 and a conical wall section 3. At the bottom 4 of the cylindrical section 22 are four ridgelike parts 5–8 arranged in such a manner as to form a cross. Throughflow openings 9 and 10 are arranged between two adjacent parts. The conical section 3 is provided with a number of openings 11 for compressed air. The nozzle 2 is located inside a silo 12 having a conically closed upper part 13, a cylindrical part 14 and a conical bottom part 15 with an outlet 16. The silo 12 stands on four legs 17–20.

The means described above functions as follows: It is assumed that the transport pipe 1 is connected in some way to a tank vehicle delivering a homogenous fodder mix with the help of compressed air, the volume being transferred from the tank comprising 10% fodder and 90% compressed air. When the volume being transferred reaches the nozzle 2, the fodder runs vertically straight down and is distributed by the ridge-like parts 5–8 so that the fodder leaves the nozzle 2 through the openings located on each side of the ridges. The compressed air flows out through the openings 11 and forms a sheath or casing located inside the conical part 13 and the cylindrical part 14 so that the fodder mix 21 leaving the nozzle 2 is completely screened from the conical part 13 and the cylindrical part 14. The existence of this air curtain between the fodder mix 21 and the parts 13 and 14 provides the advantage that the fodder mix 21 retains its homogeneity.

It is no doubt clear that the present invention is not only applicable to silos. It may also be necessary to transfer a homogenous fodder mix to a storage place of some other type with retained homogeneity. This is possible with a means reminiscent of that shown in the drawing but deviating therefrom in that the bottom 15 and legs 17–20 have been removed. This results in a means consisting of a nozzle according to the invention, which is surrounded by a sheath or casing of solid material and which, upon emptying, creates a curtain or sheath of gaseous material inside the casing of solid material.

I claim:

1. Means for introducing a compressed-air conveyed homogeneous mixture of products having different density, which products may be of grain size or powder size, from a transport pipe and into a storage container while maintaining the homogeneity of the mixture, said means comprising an outlet end on said transport pipe positioned within said storage container, a nozzle on said outlet end for the discharge of the mixture therethrough, said nozzle comprising a throughflow opening in general alignment with said outlet end for discharge of the homogeneous mixture therethrough and into the storage container, said nozzle also including compressed-air openings directed generally laterally outward into the storage container, said compressed-air openings being located between said outlet end and said throughflow opening for lateral discharge of compressed-air into a mixture-confining compressed-air sheath directly engaging and confining the mixture discharging through said throughflow opening, said nozzle further including a wall section surrounding and defining said throughflow opening, and a tapered section extending between said outlet end and said wall section to define a material passage therebetween, said compressed-air openings being formed laterally through said tapered section, said wall section defining a cross-sectional area greater than that of said outlet end, said tapered section enlarging from said outlet end to said wall section.

2. The apparatus of claim 1 wherein said storage container has a closed top, said outlet end of said transport pipe extending centrally through said closed top and into said storage container, said closed top tapering upward to the outlet end receiving central portion thereof.

3. The apparatus of claim 2 wherein said wall section is cylindrical, said tapered section is conical, and said closed top is conical.

4. The apparatus of claim 3 including transverse ridges spanning said wall section, said throughflow opening being defined to the sides of said ridges.

* * * * *